Feb. 9, 1971 — L. A. NEEDHAM — 3,561,817
SAFETY HARNESS ASSEMBLY
Filed June 20, 1968

INVENTOR:
LEO AUSTIN NEEDHAM
BY
Elliott & Pastoriza
ATTORNEYS ated Feb. 9, 1971

3,561,817
SAFETY HARNESS ASSEMBLY
Leo Austin Needham, 6104 Glen Alder,
Hollywood, Calif. 90028
Filed June 20, 1968, Ser. No. 738,684
Int. Cl. B60r 21/10
U.S. Cl. 297—216                                    7 Claims

ABSTRACT OF THE DISCLOSURE

A vehicle safety harness assembly includes shoulder straps interconnected with a slidable counterweight located either beneath the seat or behind it. Upon abrupt deceleration, the counterweight is thrust forwardly with a greater force than the upper body portion of the user and thus swiftly exerts tension on the straps so that the user is pulled rearwardly against the backrest where he is restrained from forward movement until the period of harmful deceleration has elapsed. An underlying support platform for the counterweight may be sloped to adjust the horizontal force component of the counterweight to accommodate the varying needs of different users.

---

The present invention relates to a safety harness assembly and more specifically to a vehicle safety harness assembly arranged to pull a user rearwardly against a seat backrest during times of abrupt deceleration.

BACKGROUND OF THE INVENTION

Numerous types of vehicle seat belts and safety harnesses have been developed for preventing the user from becoming injured during vehicle deceleration caused by collision or abrupt braking to avert an accident. The safety harness is arranged on the user such as an automobile driver or passenger, aircraft pilot or occupant to brace the user from being pitched forwardly into harmful contact with the vehicle dash board, steering wheel, control panel, etc., depending on the type of vehicle.

In order to provide the user with the necessary comfort and range of motion during normal vehicle movement conditions he customarily is not tightly bound against the seat backrest by a harness. While allowing the harness to be relaxed is beneficial to the user during these normal conditions the resulting harness looseness or slack is disadvantageous during deceleration. Although the harness may be sufficient to restrain the user from being pitched forwardly into harmful contact, he can still be shaken back and forth causing nausea, harness strap burns, and whiplash dangers.

One conventional type of safety harness includes a shock-absorbing device which does not interfere with the user's freedom of movement during normal motion conditions but reacts to sudden jerking by the straps during deceleration to progressively restrain the user from being pitched further forwardly. Again this type of arrangement as well as safety harnesses incorporating related types of inertia operated devices merely arrest forward travel of the user while failing to restrain his being tossed back and forth as previously mentioned.

BRIEF SUMMARY OF THE INVENTION

Briefly, the present invention is a vehicle safety harness assembly including harness means characterized by a seat belt positionable across a front body section of the user who may be an operator or occupant of any type of typical vehicle capable of being confronted with abrupt deceleration situations. Attached to the seat belt is strap means preferably in the form of a pair of shoulder straps which extend upwardly from the seat belt across the users' shoulders and backrest top and eventually are joined together as a third strap at a point located in back of the user. The third strap is attached to a movable counterweight arranged and sized so that during abrupt deceleration of the vehicle, it is thrust forwardly to countervail and override the tendency of the user to be thrust forwardly. The greater forward thrust of the counterweight places the strap means in tension and causes the strap means to pull the user backwardly against the backrest where the users' motion is restrained to protect him from potential injury.

In a preferred construction the counterweight is slidably supported on a sloped platform inclined from its rearward edge to its forward edge in order to adjust the horizontal counterweight force component. The slope angle is either increased or decreased in order to decrease or increase the desired predetermined horizontal force component, respectively. A forward stop may be connected to the forward edge of the platform in order to prevent movement of the counterweight beyond the platform forward edge. Similarly, lateral stops may be positioned on the side edges of the platform for preventing movement of the counterweight over the platform side edges.

In order to properly orient the third strap it is passed over a guide means preferably in the form of one or more guide rollers capable of minimizing friction and hence facilitating quick rearward movement of the user against the backrest in response to forward thrust by the counterweight. In accordance with one construction, a single guide means is positioned rearwardly of the seat for directing the strap means forwardly to the counterweight resting on the platform positioned beneath the seat. In accordance with a second construction, a first strap guide means positioned rearwardly of the seat directs the strap means rearwardly to a second guide means which directs the strap means forwardly to the counterweight resting on the platform positioned behind the seat. The second construction accommodates those situations where there is either no room beneath the seat, it is easier to package and position the counterweight and its sloped platform behind the seat, or this position is desirable for safety reasons.

BRIEF DESCRIPTION OF THE DRAWINGS

The numerous benefits and unique aspects of the present invention will be fully understood when the following detailed description is studied in conjunction with the drawings, in which.

DETAILED DESCRIPTION OF THE PREFERRED EMBODIMENTS

Figure 1:
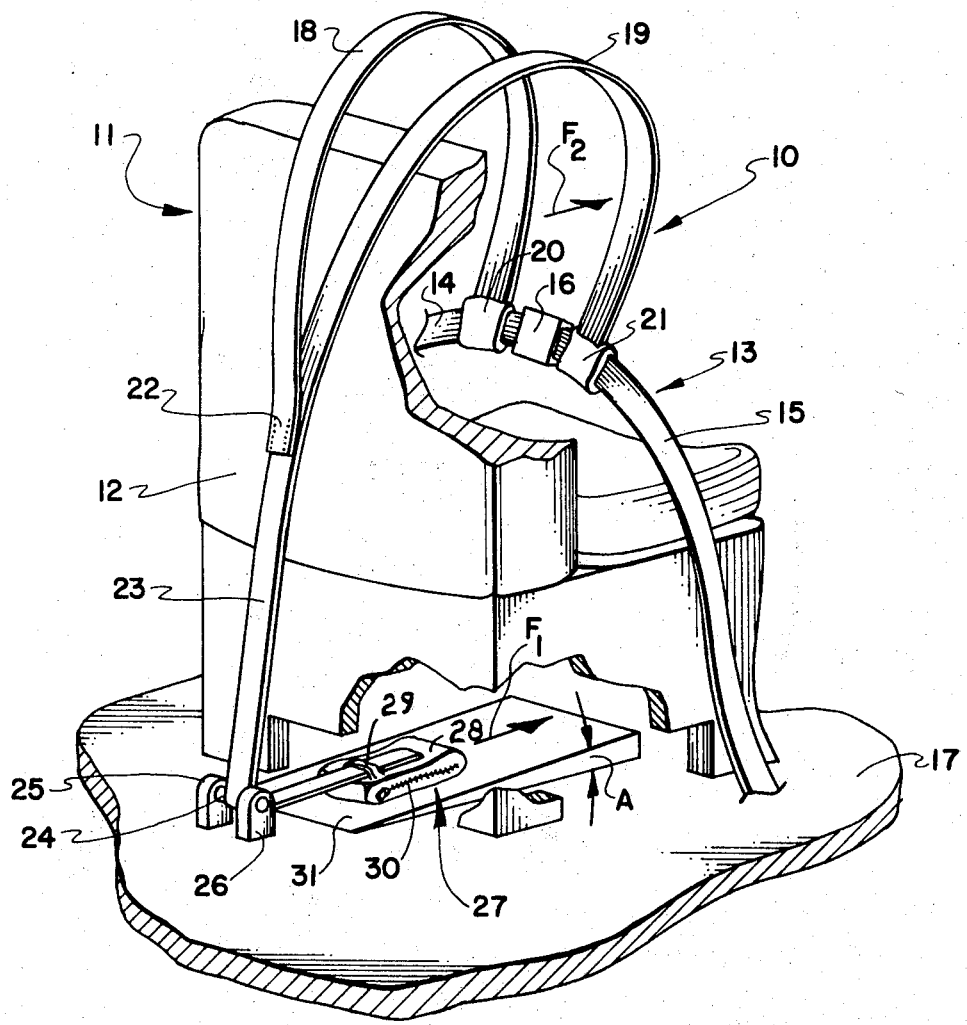
FIG. 1 is a perspective fragmentary view of the present invention showing how the safety harness assembly would be arranged relative to a user and the counterweight positioned beneath the seat.

Referring now to FIG. 1, a harness assembly 10 is shown that may be arranged to fit a driver or passenger of a motor vehicle or a pilot or occupant of an aircraft or marine vehicle or any other type of user traveling in a vehicle likely to experience abrupt deceleration. A conventional seat 11 is formed with a seat backrest 12 which, as shall be explained, cooperates with safety harness assembly 10 during periods of abrupt deceleration to restrain the user from being pitched forwardly when he might encounter objects that could harm him. When the safety harness assembly is being worn by the user, a pair of waist straps 14 and 15 extend toward one another and are coupled together at their inner ends by a releasable buckle 16 capable of adjusting the combined end to end length of waist straps 14 and 15. The outer ends of waist straps 14 and 15 are suitably anchored to a vehicle raised surface or floor 17.

Harness assembly 10 includes a pair of shoulder straps 18 and 19 which are attached to waist straps 14 and 15 respectively by way of loops 20 and 21 which may slide along the waist straps. The shoulder straps rise from the loops and extend across the user's front body section and shoulders. After crossing the top of seat backrest 11, they converge at a junction 22 where they are joined together as a single third strap 23. The shoulder straps 18 and 19 and third strap 23 constitute strap means for pulling the user against seat backrest 12 as shall be fully explained. Strap 23 depends from junction 22 and is wound around the lower section of a roller guide 24 suitably journaled within a pair of studs 25 and 26 that are fixed to floor 17. From roller guide 24 third strap 23 extends substantially horizontally in a forward direction and is ultimately secured to a movable counterweight 27.

Counterweight 27 includes a covering 28 for containing therein a heavy mass (not shown). The forward end of third strap 23 is inserted through a slot under loop 29 and may either be secured to movable weight 27 by a conventional fastener or may be doubled back against itself and fastened at a point rearwardly of loop 29. A side zipper 30 may be incorporated in covering 28 to allow additional discrete weights to be positioned inside covering 28 or withdrawn therefrom to make the overall weight adjustable for purposes to be described.

Counterweight 27 rests on a sloped support platform 31 whose forward edge, relative to the direction of contemplated vehicle travel, is raised to a level above that of the platform rearward end. The inclination, represented by angle A, may be varied by substituting different platforms to accommodate the various sizes and weights of different users. Platform 31 preferably has a smooth flat metallic bearing or upper surface which may be lubricated to facilitate free sliding movement thereover by movable weight 27.

Even when relatively heavy persons use the harness 10 there is a slight inclination angle A to platform 31. Thus under normal vibrations the force of gravity tends to slide weight 27 to the rear positioning it for forward movement during deceleration. This also allows the user a maximum range of movements unlike conventional harnesses which always interfere with the user's freedom of motion during ordinary travelling conditions.

The inclination angle A of platform 31 and mass of counterweight 27 are arranged to coact so that upon abrupt deceleration of the vehicle imperiling the physical well being of the user, the forwardly directed horizontal component of force $F_1$ of counterweight 27 always exceeds the force $F_2$ of the upper body section of the user. Because forces $F_1$ and $F_2$ are opposing each other throughout harness assembly 10, force $F_1$ not only countervails force $F_2$ but completely overrides it with the net result that shoulder straps 18 and 19 automatically pull or draw the user back against backrest 11 where he is tightly restrained during the dangerous period of deceleration.

The adequate weight for slidable counterweight 27 as well as the inclination angle A of platform 31 are a function of the weight of the user's upper body portion. Preferably the weighted mass of movable weight 27 is maintained constant and only sloped platform 31 is varied to accommodate the varying personal needs of the users. For example, a person with a relatively heavy upper body portion would require the use of a sloped platform with a relatively shallow angle A while a relatively light person could use a sloped platform with a larger angle A because the horizontal component of force $F_1$ would still be sufficient to exceed force $F_2$.

Rather than arranging weight 27 and sloped platform 31 directly beneath seat 11 as illustrated in FIG. 1 it may be preferable from an installation, space available, or safety standpoint to locate weight 27 completely rearwardly of seat 11 so that the path of movement of weight 27 always occurs behind backrest 12.

Figure 2:
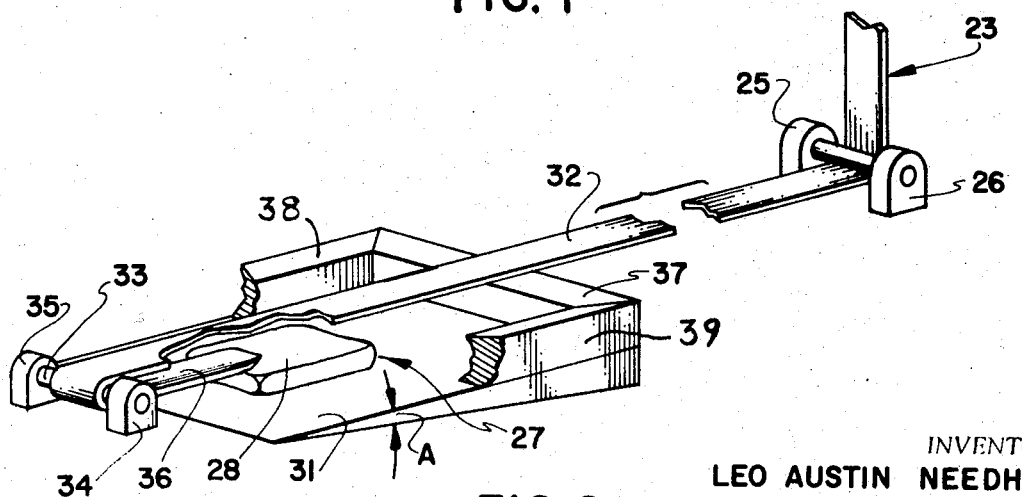
FIG. 2 is a perspective fragmentary view showing an alternative position of the counterweight in back of the seat.

Such an arrangement of this type is shown in FIG. 2 wherein the third strap 23 is still drawn around the bottom portion of roller guide 24 journaled in lugs 25 and 26. Third strap 23 is directed rearwardly as indicated by strap segment 32 to a point where it is drawn around a second strap guide means or guide roller 33 journaled at its opposite ends within lugs 34 and 35. Third strap 23 is then directed forwardly as represented by strap segment 36 to a point where it is secured to counterweight 27.

In order to prevent potentially harmful forward movements of weight 27 during periods when it is detached from harness assembly 10 or when the harness assembly is not being worn, a forward stop 37 is positioned on the forward edge of sloped platform 31. To assure that movable weight 27 doesn't slide sideways off platform 31 during moments of vehicle swerving for example, a pair of lateral stops 38 and 39 are attached to the lateral edges of platform 31. Forward stop wall 37 is fabricated so as to be removably attachable to the platform 31 and lateral stops 38 and 39 may be similarly fabricated. The lateral stops are dimensioned at their forward ends to neatly join the outer ends of stop 37.

Referring again to FIG. 1 the top of backrest 12 may be shaped and formed with polished metal or the like to facilitate sliding movement thereover by straps 18 and 19 which may be constructed of material such as nylon capable of absorbing shock and characterized by high tensile strength. Springs or resilient cords may be attached at various locations in the safety harness assembly 10 to take up slack in the straps.

While adjustment of the mass and/or the platform slope enables proper proportioning of the forces $F_1$ and $F_2$, it is also possible to incorporate a mechanical advantage mechanism similar to a block and tackle or equivalent pulley structure between the third strap 23 and the weight. This arrangement would permit a smaller mass to be used, although a greater distance of potential travel would have to be provided.

OPERATION

Keeping the above construction in mind, it can be understood how many of the previously described disadvantages of prior art safety harness assemblies, seat belt assemblies, and combinations thereof are overcome or substantially eliminated by the present invention.

Assuming that the safety harness assembly 10 is being properly worn by the user and the vehicle occupying the user is proceeding under normal conditions, then the various benefits of the present invention can be achieved. Thus, harness 10 allows the user great comfort and maximum upper body movement during these normal travelling conditions. When the vehicle is forced to abruptly decelerate either due to collision or the driver's reaction to a startling event or an emergency, counterweight 28 will be thrust forwardly over sloped support platform 31 with a horizontal force component $F_1$ that is greater than the horizontal force component $F_2$ of the user's upper body portion. Because of this force imbalance, the tendency of the user's upper body portion to be pitched forwardly is totally suppressed and instead he is drawn rearwardly against seat backrest 12 by shoulder straps 18 and 19. The pulling force of counterweight 27 is transmitted to the user by the tensile stress automatically engendered in third strap 23 and shoulder straps 18 and 19.

After the rapid deceleration period has elapsed and a different user, for example, now occupies seat 11 who has either a significantly larger or smaller upper body portion than the first user then safety harness assembly 10 can still accommodate the second user's particular safety needs. If the second user is heavier then a support platform 31 with a shallower angle A is substituted for the previous platform. Conversely, if the second user is lighter in his upper body section then a platform 31 with a larger angle A should be substituted for the previous platform.

From the foregoing it will be evident that the present invention has provided a vehicle safety harness assembly in which all of the various advantages are fully realized.

I claim:

1. A vehicle safety harness assembly for pulling the user rearwardly against a seat backrest during vehicle deceleration, comprising:
  (a) harness means positionable across a front body section of the user and extending rearwardly of the seat;
  (b) a platform;
  (c) guide means located rearwardly of the seat for directing the harness means forwardly; and
  (d) a counterweight slidably supported by the platform and directly operatively attached to the harness means for responding to deceleration conditions, the counterweight being arranged and sized to act as the main force which is thrust forwardly when deceleration conditions occur causing the harness means to pull the user backwardly against the backrest.

2. The structure according to claim 1 including:
strap means formed by the harness means;
first strap guide means formed by the guide means and positioned rearwardly of the seat for directing the strap means rearwardly; and
second strap guide means formed by the guide means positioned rearwardly of the first guide means for directing the strap means forwardly to the counterweight, the platform being positioned behind the seat.

3. The structure according to claim 1, wherein the support platform is sloped upwardly from its rearward edge to its forward edge in order to adjust the horizontal force component of the counterweight, the slope angle being increased and decreased to decrease and increase the force component, respectively.

4. The structure according to claim 1, further comprising: a forward stop connected to the forward edge of the platform for preventing movement of the counterweight beyond the platform forward edge.

5. The structure according to claim 1, further comprising lateral stops positioned on the side edges of the platform for preventing movement of the counterweight over the platform side edges.

6. A vehicle safety harness assembly for pulling the user rearwardly against a seat backrest during vehicle deceleration, comprising:
  (a) a seatbelt positionable across a front body section of the user;
  (b) a pair of shoulder straps connectable to the seatbelt, the shoulder straps extending across a front body section of the user and over the users' shoulders and backrest top to a point where they are joined together as a third strap;
  (c) a slidable counterweight attached to the third strap;
  (d) strap guide means for directing the third strap to the counterweight;
  (e) a support platform for the counterweight sloped upwardly from its rearward edge to its forward edge in order to adjust the horizontal counterweight force component, the slope angle being increased and decreased to decrease and increase the force component, respectively, wherein during deceleration the counterweight is thrust forwardly placing the third strap in tension which in turn causes the shoulder straps to pull the user backwardly against the backrest.

7. The structure according to claim 6, comprising:
  (a) a forward stop connected to the forward edge of the platform for preventing movement of the counterweight beyond the platform forward edge;
  (b) lateral stops positioned on the side edges of the platform for preventing movement of the counterweight over the platform side edges; and
  (c) wherein the guide means is a roller guide for minimizing friction with the third strap.

References Cited

UNITED STATES PATENTS

| | | | |
|---|---|---|---|
| 2,649,311 | 8/1953 | Hetrick | 297—216 |
| 2,705,586 | 4/1955 | Young | 297—389 |
| 2,708,966 | 5/1955 | Davis | 297—386 |
| 2,922,461 | 1/1960 | Braun | 297—216 |
| 3,107,121 | 10/1963 | Mougey | 297—388 |
| 3,292,744 | 12/1966 | Replogle | 297—388 |
| 3,427,070 | 2/1969 | Wallach | 297—216 |

FOREIGN PATENTS

| | | | |
|---|---|---|---|
| 1,008,764 | 11/1965 | Great Britain | 297—389 |
| 1,052,232 | 12/1966 | Great Britain | 297—389 |

FRANCIS K. ZUGEL, Primary Examiner

U.S. Cl. X.R.

297—389